United States Patent [19]

Ishizaka et al.

[11] 4,269,497
[45] May 26, 1981

[54] LENS BARREL FOR BOTH PRIORITIES OR SHUTTER SPEED PRIORITY MODE AUTOMATIC EXPOSURE SYSTEM

[75] Inventors: Sunao Ishizaka; Yoshitaka Araki, both of Tokyo; Takeshi Muryoi, Chigasaki, all of Japan

[73] Assignee: Nippon Kogaku K.K., Tokyo, Japan

[21] Appl. No.: 73,423

[22] Filed: Sep. 7, 1979

[30] Foreign Application Priority Data

Sep. 13, 1978 [JP] Japan .................................. 53-124799

[51] Int. Cl.³ ............................................. G03B 17/00
[52] U.S. Cl. .................................................... 354/286
[58] Field of Search ........................... 354/38, 46, 286; 350/252–257

[56] References Cited

U.S. PATENT DOCUMENTS 3,782,261   1/1974   Araki .................................... 354/286

*Primary Examiner*—L. T. Hix
*Assistant Examiner*—Thomas H. Tarcza
*Attorney, Agent, or Firm*—Fitzpatrick, Cella, Harper & Scinto

[57] ABSTRACT

This invention relates particularly to a phototaking lens having at least a shutter speed priority automatic exposure system. The lens has a mount engageable with a mount of a camera body, which has a signal member operable when the lens is mounted and control means for making a caution and/or for stopping camera operation in response to an output of the signal member. The lens is further equipped with means for presenting the operation of the signal member, this means being disposed on the lens mount facing the signal member as the mount of the lens is engaged with the mount of the camera body. The signal member includes a retractable signal pin projected from the mount of the camera body and the preventing means includes a recess on the mount of the lens which is acceptable to the signal pin.

6 Claims, 6 Drawing Figures

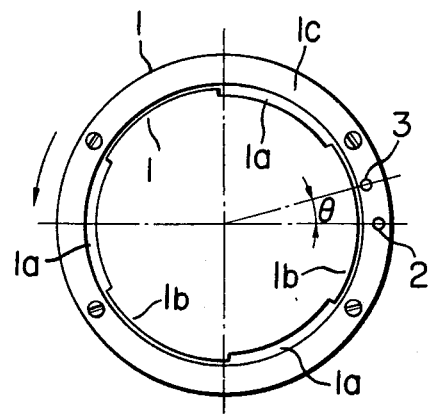
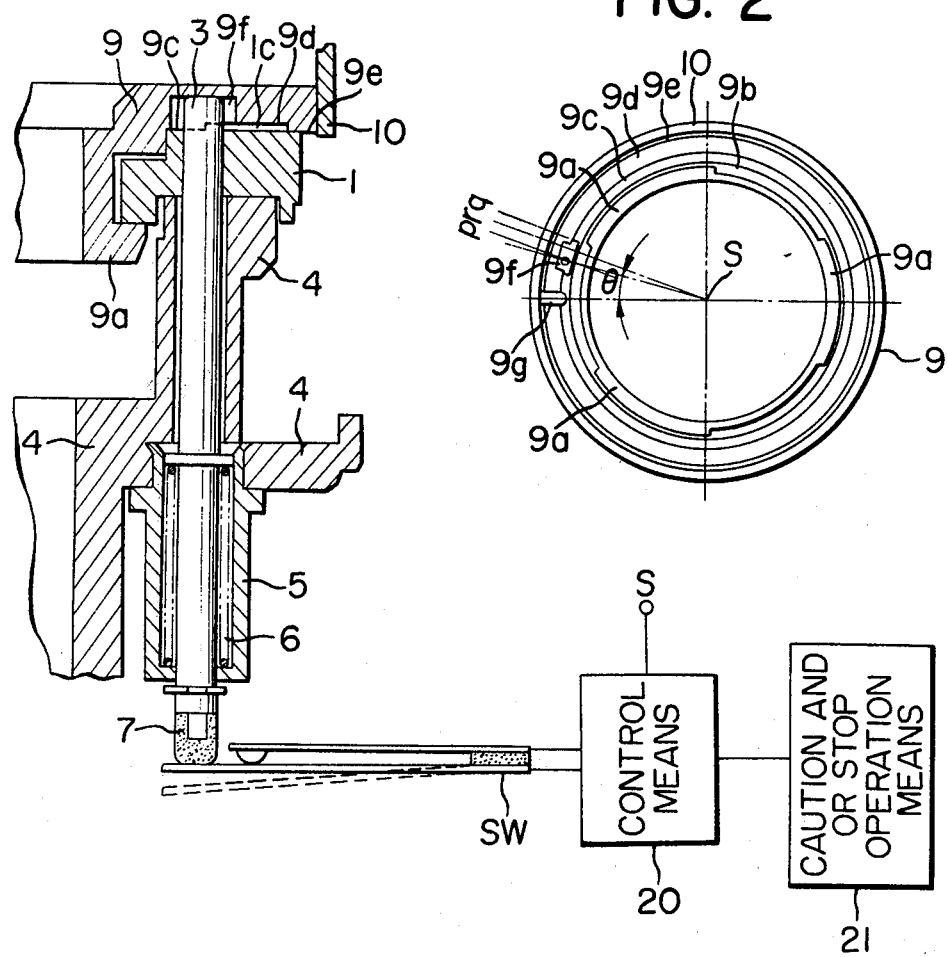

LENS BARREL FOR BOTH PRIORITIES OR SHUTTER SPEED PRIORITY MODE AUTOMATIC EXPOSURE SYSTEM

BACKGROUND OF THE INVENTION

1. Field of the Invention

This invention relates to a lens barrel having at least a shutter speed priority automatic exposure system to be mounted on a camera body having at least a function of shutter speed priority automatic exposure system.

2. Description of the Prior Art

There has been a lens barrel of an aperture priority automatic exposure system which automatically controls a shutter speed in response to a preset aperture value, or a lens barrel of a shutter speed priority automatic exposure system which automatically controls an aperture value in response to a preset shutter speed, or both priorities automatic exposure system, which provides with both functions of aperture priority automatic exposure (AE) system and shutter speed priority AE system and which enables to selectively use the either system.

When a lens barrel of an aperture priority AE system is mounted on a camera body of a shutter speed priority AE system or of both priorities AE system which equipped with a shutter speed priority AE function and is operated for phototaking under shutter speed AE mode, it is not possible to make an appropriate phototaking. For enabling this operation, it is considered to provide at the side of camera body a signal member which is actuated when a lens barrel of aperture priority AE system is mounted so as to transmit a signal to a control system of camera body to the effect that such type of lens barrel is mounted. However, if a camera body is constituted in such a way as mentioned, and when a lens barrel of shutter speed priority AE system or of both priorities AE system is mounted on such camera body, there has been a problem to transmit a signal which shows that the mounted lens barrel is not of aperture priority AE system.

SUMMARY OF THE INVENTION

This invention overcomes said defect and presents a lens barrel for a shutter speed priority AE system or both priorities AE system which prevents the actuation of a signal member provided on a camera body having the function of shutter speed priority AE system.

This invention presents a phototaking lens having at least a function of shutter speed priority AE system and having a mount engageable with a mount of a camera body having at least a function of shutter speed priority AE system and the camera body includes a signal member operable when said phototaking lens is mounted on the mount of the camera body and control means for displaying a caution and/or for stopping the operation of the camera in response to the output of said signal member. The characteristic feature of this invention resides in the provision of means for preventing the operation of the signal member, the preventing means being disposed on the lens mount in such a manner that when the lens mount is engaged with the mount of the camera body, the preventing means faces the signal member.

BRIEF DESCRIPTION OF THE DRAWINGS

FIG. 1 is a front view of a mount of a camera body of both priorities AE system.

FIG. 2 is a front view of a mount of a lens barrel for both priorities or shutter speed priority AE mode.

FIG. 3 shows a partially enlarged cross section representing the state where the mount of the lens barrel is engaged with the mount of the camera body.

DESCRIPTION OF THE PREFERRED EMBODIMENT

Figure 4:
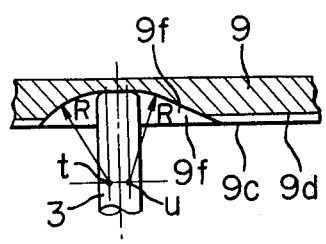
FIG. 4 shows a cross section showing the shape of a recess.

As shown in the drawings, which show an embodiment of this invention, on mount 1 of a camera body, mount engaging pawl 1a, recess 1b and mount reference surface 1c are formed, and lens mounting positioning pin 2 and discriminating pin 3 as a signal member are spaced apart by an angle $\theta$ to each other.

In FIG. 3, which shows that the mount of a lens barrel is engaged with a mount of camera body, a member 5 for retaining the pin 3 is fixed at camera body 4 and spring 6 is provided between the member 5 and the pin 3 for biasing the pin 3 upwardly, and at the lower end of the pin 3 there is an insulating member 7. Switch SW is opened as insulating member 7 moves downwardly and is connected to control means 20. The control means 20 is operated only when OFF signal of switch SW and shutter speed priority mode selecting signal S which is obtained from a not-shown mode switching means provided at camera body are coming in and it activates a caution means 21 effecting caution display and/or stop of the operation of the camera.

In FIG. 2, at lens barrel mount 9, mount engaging pawl 9a as shown in FIG. 3 is provided projecting from the surface 9b, and mount reference surfaces 9c and 9e and the surface 9d, which is lower than the reference surface by a small amount, are formed, respectively. Mount 9 has a groove-shaped recess 9f which receives the discriminating pin 3 by the force of spring 6 and lens mounting positioning groove 9g engageable with the positioning pin 2. The mount 9 is surrounded by outer shell 10.

The recess 9f is worked under the condition of that it forms right angle against line rs and it is provided on the locus of the pin 3 on the camera body. The line rs is formed by connecting the center S of the mount 9 and the position r which is approximately the center, when the pin 2 and the groove 9g are engaged, of the position p where the pin 3 stops and the point q which is the start point of the recess 9f.

Next, the operation is explained hereinafter.

Mount engaging pawl 9a of the lens barrel is inserted into the recess 1b of the camera body. As the lens barrel is rotated counterclockwisely as shown in FIG. 1 by the arrow, the engaging pawl 9a engages with mount engaging pawl 1a of the camera body and the positioning groove 9g faces the pin 2 of the camera body, the pin 2 falls into the groove 9g to form conventional bayonet coupling. Simultaneously with the falling of the pin 2 into the groove 9g, the pin 3 falls into the recess 9f with the aid of the upward biasing of spring 6 (FIG. 3), and switch SW is turned to be closed (the real line in FIG.

3). The control means 20 connected to switch SW is actuated, as explained in the foregoing, only when the switch is in OFF state and shutter speed priority mode is set. Thus when said lens barrel of the structure in which the switch is always turned to ON state by the falling engagement of the pin 3 with the recess 9f, is mounted on a camera body of both priority AE system, the control means 20 is not operated in either shutter speed priority mode or aperture priority mode.

Consequently, when the lens barrel of this invention used for both priorities or shutter speed priority mode is engaged with the camera of both priorities AE system, appropriate exposure phototaking is performed in either mode of aperture priority or shutter speed priority.

Next, the explanation will be made for the case in which the lens barrel which has been used for the conventional aperture priority AE system camera is mounted on a camera of both priorities AE system. In this conventional aperture priority mode lens barrel, the recess 9f of this invention is not provided. Thus when the engaging pawl engages with mount engaging pawl and the pin 2 of the camera body falls in the groove 9g of the lens barrel, switch SW is in the OFF state by the pin 3 as shown by the broken line in FIG. 3. In this OFF state and the camera body is set to shutter speed priority mode, the control means 20 will be operated as explained before. Therefore, the control means 20 actuates caution means 21, and in the case that the switch connected in series with the electric source of a camera of electro-magnetic release control type is turned to OFF, the release is prevented and the phototaking is not realized, and in the case where the caution is displayed, the display element is turned on to notice that conventional aperture priority system lens barrel is mounted. However, if the aperture priority mode of camera body is selected, appropriate exposure phototaking is realized in that mode.

In the above mentioned embodiment, the shape of the recess provided at the lens barrel is as shown in FIG. 4. In this case, the recess if formed by curved surface having two centres t, u, of the same radius R so that the edges have gentle slope and it is very easy to dismount the lens barrel by rotating it clockwisely to disengage the pin 3 from the recess 9f.

Figure 5:
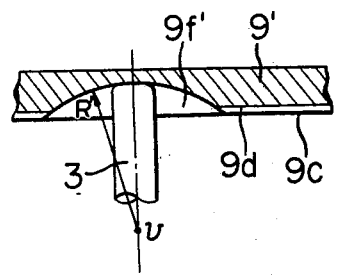
FIG. 5 shows a cross section of another shape of a recess.

Instead of the recess in FIG. 4, a recess having a cross-sectional view of FIG. 5 can be used. This recess 9f is formed by a curved surface having one centre V of the radius R'.

Figure 6:
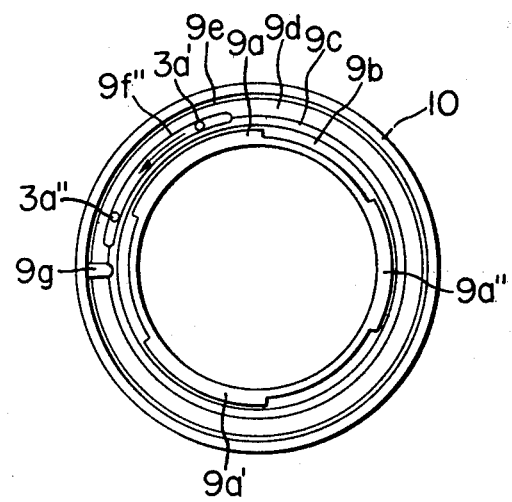
FIG. 6 shows a cross section of further shape of a recess.

In the embodiments of the recess explained in the foregoing, they are provided in the linear form. The recess 9f'' shown in FIG. 6 is formed in a circular shape having its centre at the optical axis of the lens. In this shape of the recess, when the engaging pawl of the lens is inserted into the recess of the camera body, the discriminating pin 3 is in the position 3a' and when the positioning pin falls into the positioning groove the discriminating pin 3 comes to the position 3a''.

Although the explanation has been made for the camera body of both priorities system, it is nothing to say that the present invention can be applicable to a camera body of shutter speed priority system.

We claim:

1. A device for connecting a phototaking lens with a camera, the camera having a device for generating an output by which a diaphragm aperture of the lens is adjusted to a value obtained from a preset shutter speed and an object brightness, and the lens having a device for driving the diaphragm aperture in coordination with said output generating device in the camera, wherein the camera and the lens are, respectively, formed with surfaces engaging each other and wherein the lens is completely connected to the camera at a defined final position upon relative rotation of the lens with respect to the camera with said engaging surfaces opposed to each other, the device comprising:
   (a) a discriminating pin having an end retractably projected from the engaging surface of the camera;
   (b) means for biasing the pin so that the pin may be projected;
   (c) switching means for generating in response to the retraction of the pin a signal which indicates that no incoordination between the camera and the lens is possible; and
   (d) a recess means for impeding the retraction of the pin, the recess means being formed to be opposed to said pin at least at said defined final position of the engaging surface of the phototaking lens, the recess means being of a size into which said end can be inserted.

2. A device according to claim 1, wherein said recess means includes a straight groove having an edge in which said end of the pin is to be inserted when both the engaging surfaces are rotated relatively, the edge having a gentle slope gradually becoming shallow from the bottom of the groove to the engaging surface.

3. A device according to claim 1, wherein said recess means includes a circular groove in which the pin is to be inserted when both the engaging surfaces are rotated relatively.

4. A phototaking lens adapted for use with a camera body, said camera body having (1) a device for generating an output by which a diaphragm aperture of the lens is adjusted to a value obtained from a preset shutter speed and an object brightness, (2) a first surface designed to engage a second surface formed on said lens when said lens is mounted on said camera body, (3) a retractable discriminating pin which has an end projecting from said first surface and is normally biased outwardly from said first surface and (4) a switching means for generating in response to the retraction of said pin a signal which indicates that no incoordination between the camera and lens is possible; said lens comprising a device for driving said diaphragm aperture in coordination with said output generation device, mounting means including a second surface formed to engage said first surface of said camera when mounted on said camera wherein the lens is completely connected to the camera at a defined final position upon relative rotation of the lens with respect to the camera with said first and second surfaces opposed to each other, and a recess means for impeding the retraction of the pin, said recess means being formed to be opposed to said pin at least at said defined final position, said recess means being of a size into which said end of said pin can be inserted.

5. A phototaking lens according to claim 4, wherein said recess means includes a straight groove having an edge in which said end of the pin is to be inserted when both the engaging surfaces are rotated relatively, the edge having a gentle slope gradually becoming shallow from the bottom of the groove to the engaging surface.

6. A phototaking lens according to claim 4, wherein said recess means includes a circular groove in which the pin is to be inserted when both the engaging surfaces are rotated relatively.

* * * * *

UNITED STATES PATENT AND TRADEMARK OFFICE
CERTIFICATE OF CORRECTION

PATENT NO. : 4,269,497

DATED : May 26, 1981

INVENTOR(S) : SUNAO ISHIZAKA, ET AL.

It is certified that error appears in the above—identified patent and that said Letters Patent is hereby corrected as shown below:

Headnote - Foreign Application Priority Data
 change "Sep. 13, 1978 [JP] Japan ..........53-124799" to
 -- Sep. 13, 1978 [JP] Japan ...............53-124799 [U] --;

Abstract - change "presenting" to -- preventing --;

Col. 1, line 28, after "which" insert --is--;

Col. 2, line 49, delete --of--;

Col. 3, line 25, after "and" insert --where--;

Col. 3, line 47, change "9f" to --9f'--;

Col. 3, line 51, change "9f'" to --9f"--.

Signed and Sealed this

Third Day of November 1981

[SEAL]

Attest:

GERALD J. MOSSINGHOFF

Attesting Officer

Commissioner of Patents and Trademarks